(12) United States Patent
Tzeng et al.

(10) Patent No.: US 7,943,042 B2
(45) Date of Patent: May 17, 2011

(54) MAGNETIC FILTERING FILM

(75) Inventors: Hsinn-Jyh Tzeng, Taipei (TW);
Biing-Hwa Yan, Jhongli (TW);
Chen-Ling Cheng, Yongkang (TW);
Jung-Ming Ho, Yongkang (TW);
Cheng-Han Tsai, Yongkang (TW);
Chien-Chun Kan, Yongkang (TW)

(73) Assignee: Southern Taiwan University, Tainan County (TW)

( * ) Notice: Subject to any disclaimer, the term of this patent is extended or adjusted under 35 U.S.C. 154(b) by 300 days.

(21) Appl. No.: 12/068,749

(22) Filed: Feb. 11, 2008

(65) Prior Publication Data

US 2010/0133163 A1    Jun. 3, 2010

(51) Int. Cl.
*B01D 35/06* (2006.01)
*C02F 1/48* (2006.01)

(52) U.S. Cl. ........ 210/222; 210/223; 210/489; 210/498; 210/500.25; 210/510.1; 55/486

(58) Field of Classification Search .............. 210/222, 210/223, 489, 498, 500.25, 510.1; 55/486
See application file for complete search history.

(56) References Cited

U.S. PATENT DOCUMENTS

| 1,663,298 | A * | 3/1928 | Geer et al. | 210/498 |
| 3,136,720 | A * | 6/1964 | Baermann | 210/222 |
| 7,494,587 | B2 * | 2/2009 | Yan et al. | 210/222 |
| 2007/0095738 | A1 * | 5/2007 | Zhang | 210/222 |
| 2010/0133163 | A1 * | 6/2010 | Tzeng et al. | 210/223 |

* cited by examiner

*Primary Examiner* — David A Reifsnyder
(74) *Attorney, Agent, or Firm* — Jackson IPG PLLC; Demian K. Jackson

(57) ABSTRACT

A magnetic filtering film is used to remove grains from liquid that goes through the magnetic filtering film. The magnetic filtering film includes a rubber film and micro-magnets. The rubber film is made of organic polymer. The rubber film is formed with apertures through which liquid can go. The micro-magnets are distributed in the rubber film for attracting ferromagnetic grains from the liquid.

12 Claims, 8 Drawing Sheets

MAGNETIC FILTERING FILM

FIELD OF THE INVENTION

The present invention relates to a filtering film and, more particularly to a magnetic filtering film including organic polymer and micro-magnets distributed in the organic polymer.

DESCRIPTION OF THE RELATED ART

In an engine, fuel is combusted to produce energy. About 21% of the energy produced by the combustion of the fuel is consumed by the friction between moving parts such as the piston, the connecting rod, the bearings, the crank shaft and the cranks. Lubrication oil is used to reduce the friction between the moving parts. However, the lubrication oil deteriorates due to heat produced by the combustion of the fuel. The combustion of the fuel produces contaminants as well. The friction between moving parts inevitably wears the moving parts, thus producing metal powder. The contaminants and the metal powder cause the lubrication to further deteriorate. Containing all the contaminants and the metal powder, the lubrication oil is hazardous for the engine and related parts, and reduces the fuel efficiency, the performance and life of the engine, but increases the emission of waste. Hence, used lubrication oil must regularly be replaced with fresh lubrication oil. In addition to the regular replacement of the lubrication oil, a good filter is important for retaining the functionality of the lubrication oil and, therefore, the performance of the engine.

Disclosed in Taiwanese Patent Publication No. 383621 is a magnetic filter for lubrication oil. The magnetic filter includes a shell, a filtering unit, a magnetic unit and a spring. Entrances and an exit are defined in the shell. The filtering unit is disposed within the shell. The filtering unit includes an upper disc, a lower disc, a metal mesh between the upper and lower discs and filtering paper around the metal mesh. The filtering unit is provided between the entrances and the exit. The spring is compressed between a roof of the shell and the upper disc of the filtering unit, thus firmly positioning the filtering unit within the shell. The magnetic unit is disposed within the metal mesh of the filtering unit, near the exit of the shell. The magnetic unit includes a stand, a magnet mounted on the sand and a cover for covering the magnet. Thus, the lubrication oil goes through the filtering unit and past the magnetic unit on its way to the exit from the entrances. The filtering unit filters grains. The magnetic unit attracts ferromagnetic grains. The structure of this conventional magnetic filter is however complicated.

The present invention is therefore intended to obviate or at least alleviate the problems encountered in prior art.

SUMMARY OF THE INVENTION

It is the primary objective of the present invention to provide a magnetic filtering film for filtering and activating lubrication oil.

To achieve the primary objective of the present invention, a magnetic filtering film includes a rubber film and micro-magnets. The rubber film is made of organic polymer and formed with apertures through which liquid can go. The micro-magnets are distributed in the rubber film for attracting ferromagnetic grains from the liquid.

Other objectives, advantages and features of the present invention will become apparent from the following description referring to the attached drawings.

BRIEF DESCRIPTION OF THE DRAWINGS

The present invention will be described via the detailed illustration of three embodiments referring to the drawings.

DETAILED DESCRIPTION OF EMBODIMENT

Figure 1:
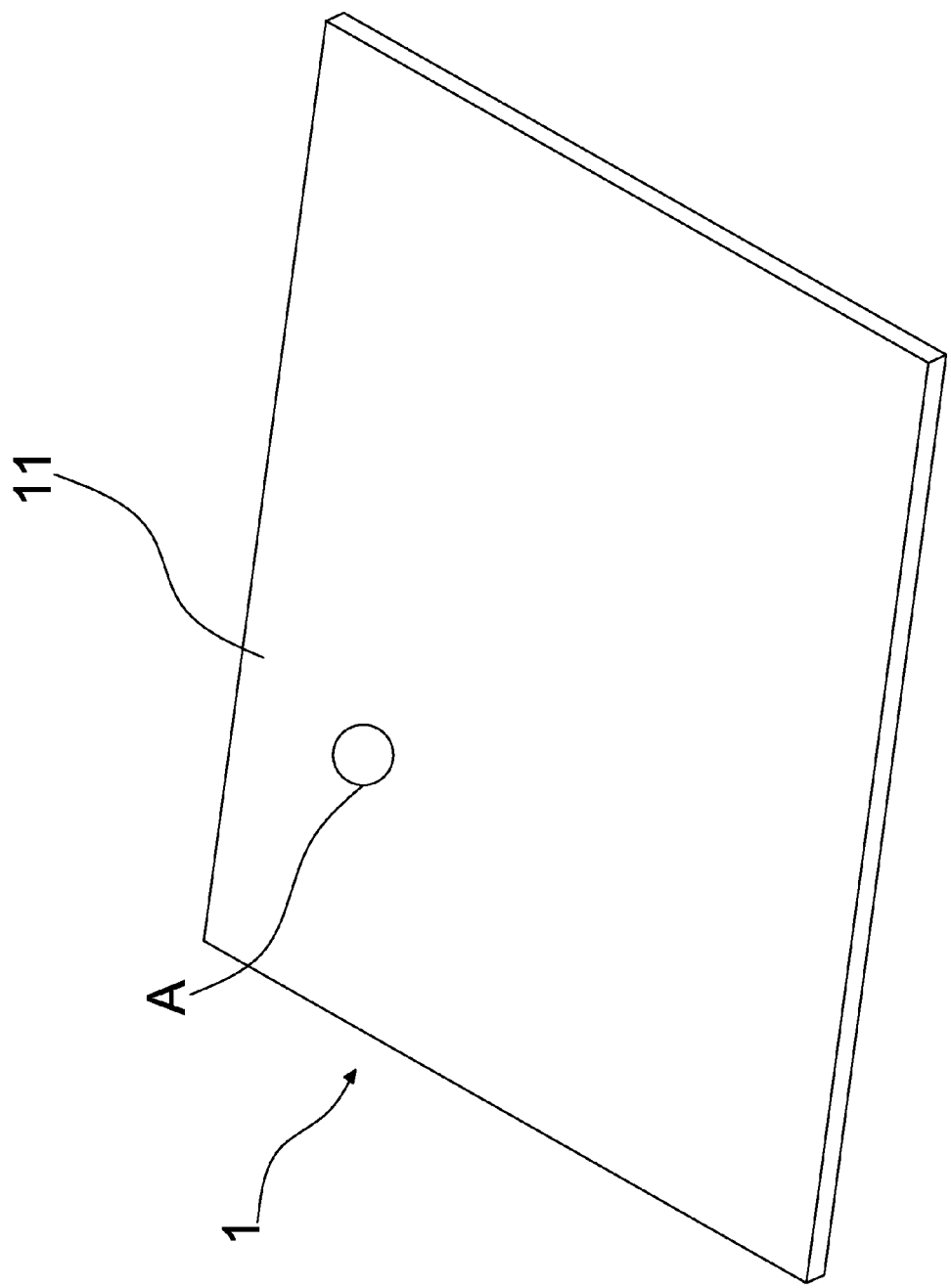
FIG. 1 is a perspective view of a magnetic filtering film according to the first embodiment of the present invention.
Figure 2:
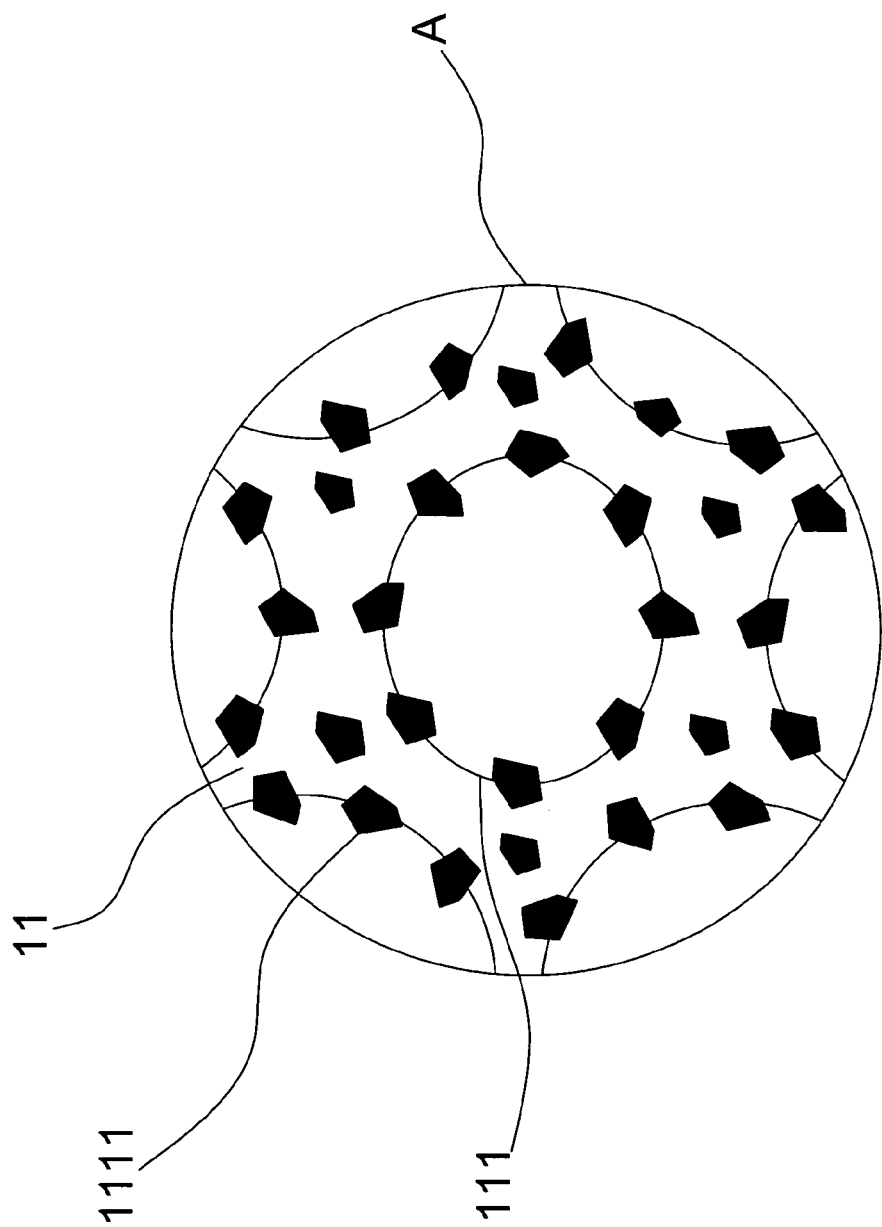
FIG. 2 is an enlarged, partial view of the magnetic filtering film shown in FIG. 1.
Figure 3:
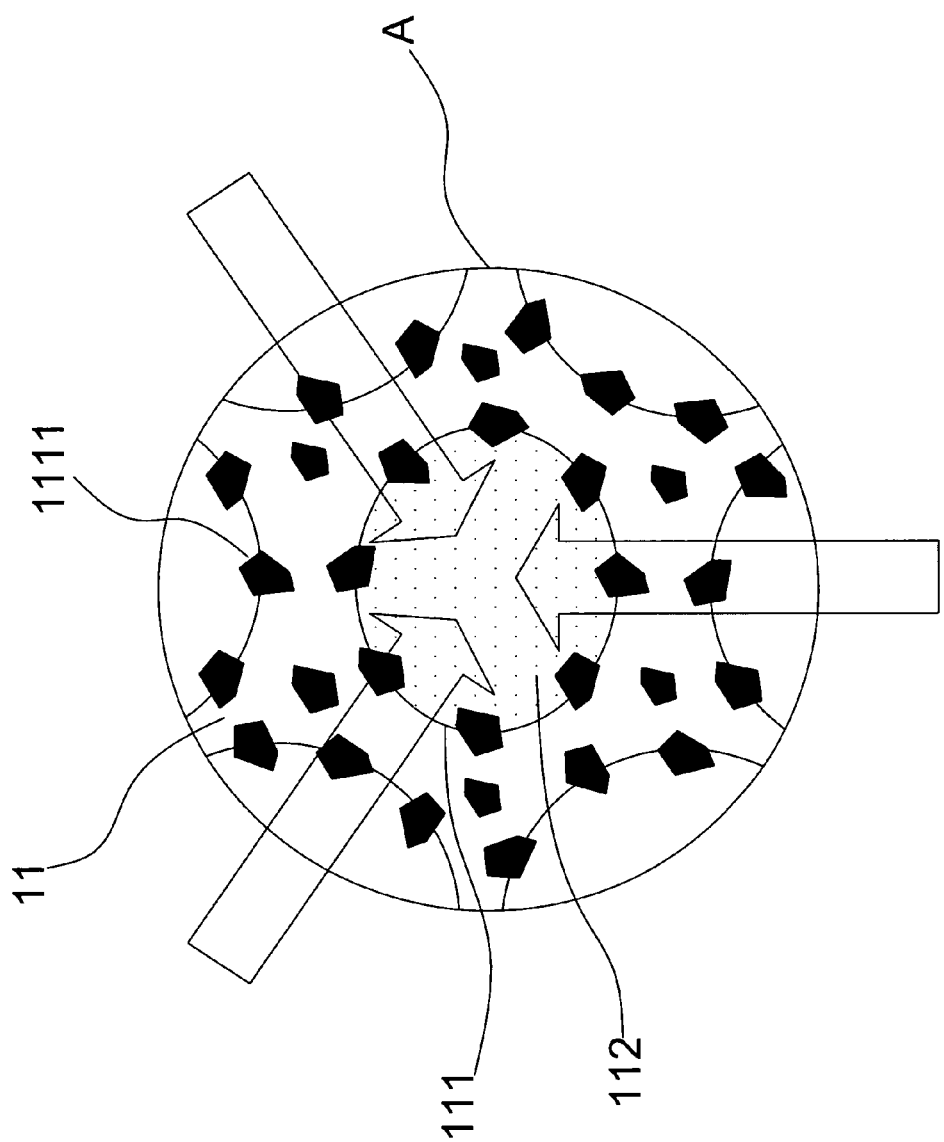
FIG. 3 shows lubrication oil filtered by the magnetic filtering film shown in FIG. 2.

Referring to FIGS. 1 to 3, shown is a magnetic filtering film 1 according to a first embodiment of the present invention. The magnetic filtering film 1 includes a rubber film 11 and strong micro-magnets 111 distributed in the rubber film 11. The rubber film 11 includes a plurality of apertures 111 defined therein. The diameters of the micro-magnets 111 vary and are larger than 0.1 micrometer. Lubrication oil goes through the apertures 111. Ferromagnetic grains 112 distributed in the lubrication will be attracted to the micro-magnets 1111. Thus, the ferromagnetic grains 112 are removed from the lubrication. Moreover, the molecules of the lubrication oil are activated by the micro-magnets 1111.

The rubber film 11 is made of organic polymer such as synthetic rubber and composite rubber. The synthetic rubber may be chloropene rubber, ethylene propylene diene monomer or polyurethane thermoplastic polyolefin. The composite rubber may be styrene-butadiene-styrene copolymer, styrene-ethylene-butylene-styrene copolymer or thermoplastic polyolefin. The organic polymer is durable against aging and oil and elastic.

Figure 4:
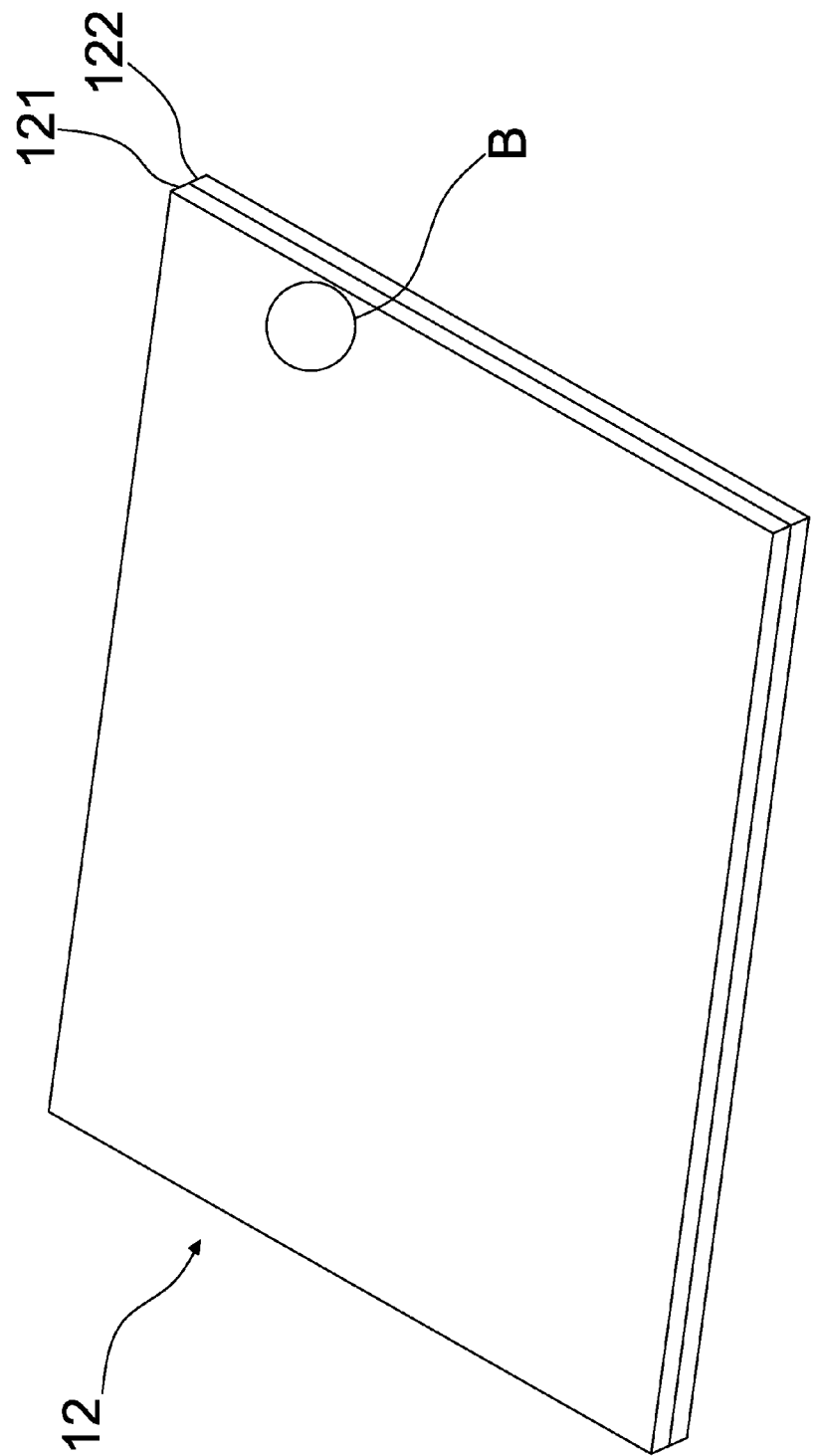
FIG. 4 is a perspective view of a magnetic filtering laminate according to the second embodiment of the present invention.
Figure 5:
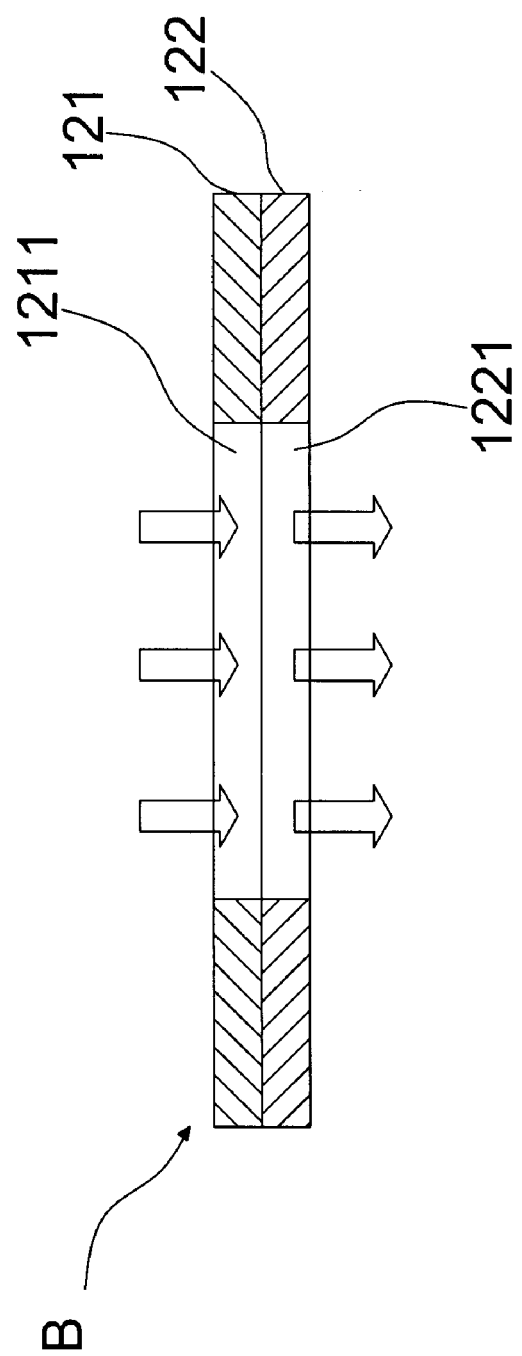
FIG. 5 is an enlarged, partial, cross-sectional view of the magnetic filtering laminate shown in FIG. 4.

Referring to FIGS. 4 and 5, there is shown a magnetic filtering laminate 12 according to a second embodiment of the present invention. The magnetic filtering laminate 12 includes two magnetic filtering films 121 and 122. The magnetic filtering films 121 and 122 are both identical to the magnetic filtering film 11. The magnetic filtering film 121 includes apertures 1211 defined therein. The magnetic filtering film 122 includes apertures 1221 defined therein. The apertures 1211 of the magnetic filtering film 121 are aligned with the apertures 1221 of the magnetic filtering film 122.

Figure 6:
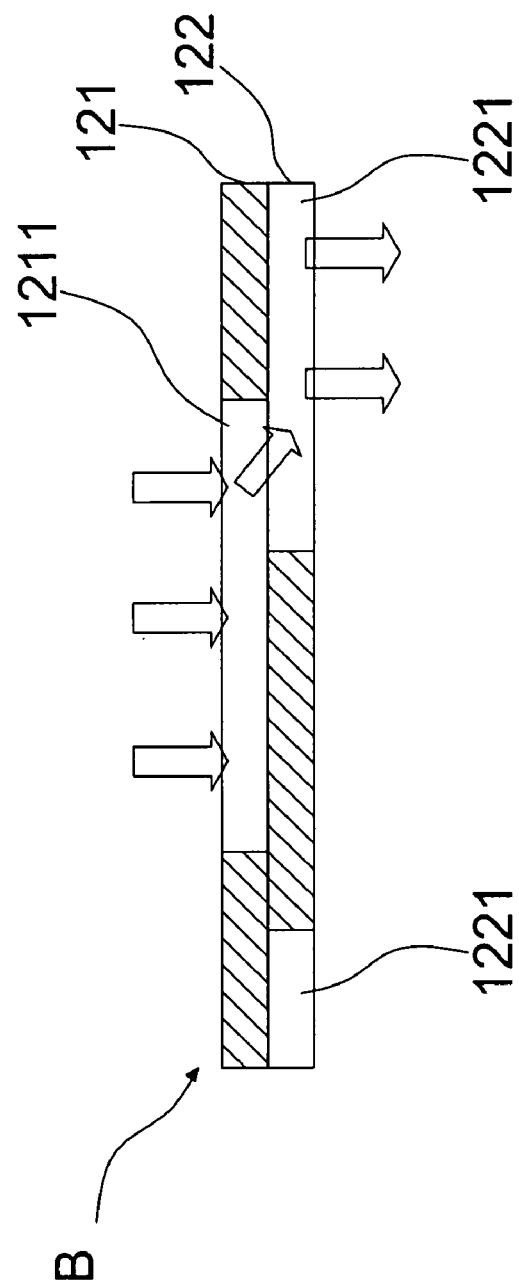
FIG. 6 is an enlarged, partial, cross-sectional view of a magnetic filtering laminate according to the third embodiment of the present invention.

Referring to FIG. 6, there is shown a magnetic filtering laminate 12 according to a third embodiment of the present invention. The third embodiment is identical to the second embodiment except that the apertures 1211 of the magnetic filtering film 121 are biased from the apertures 1221 of the magnetic filtering film 122.

Figure 7:
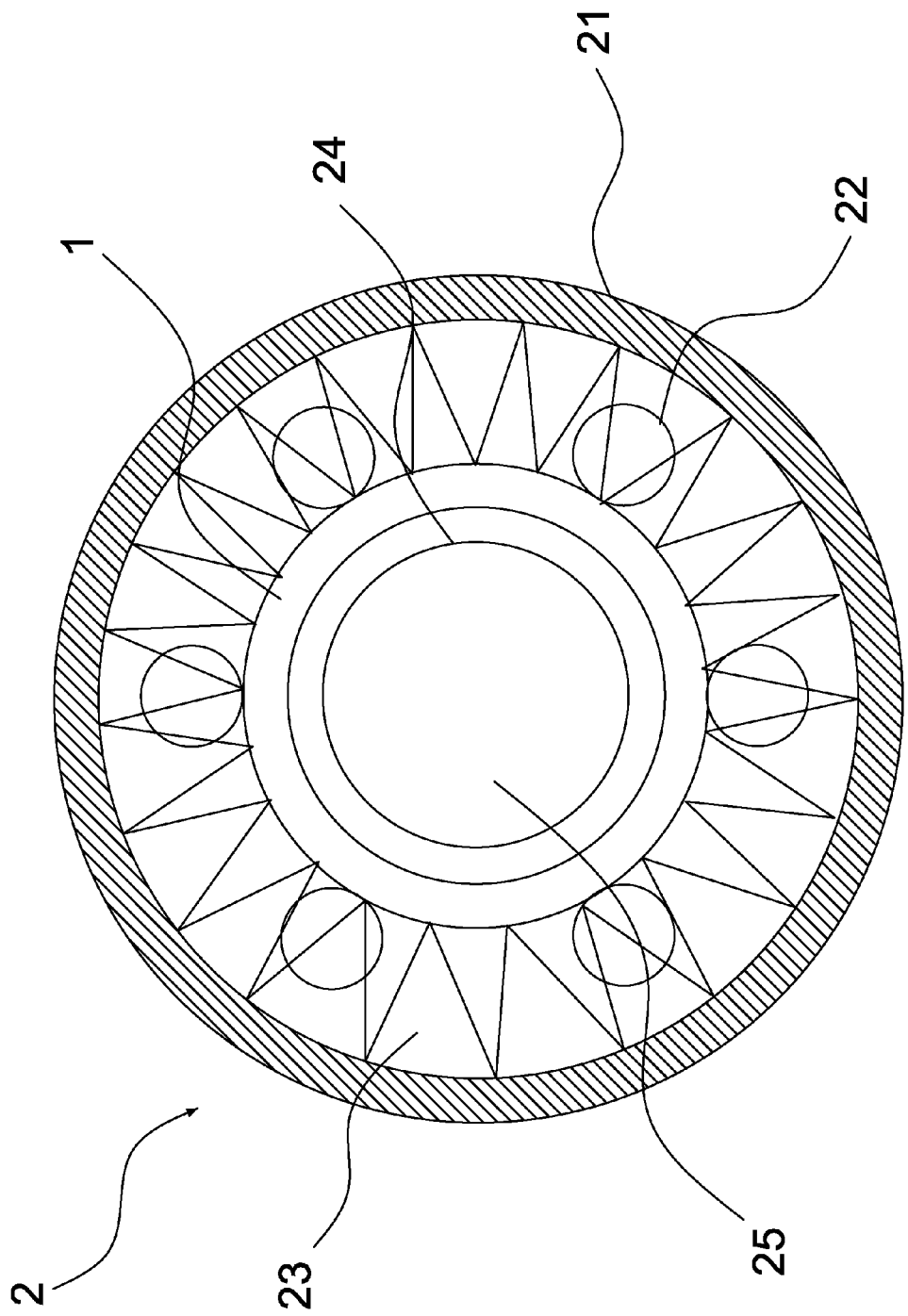
FIG. 7 is a cross-sectional view of a filter equipped with the magnetic filtering film shown in FIG. 1.
Figure 8:
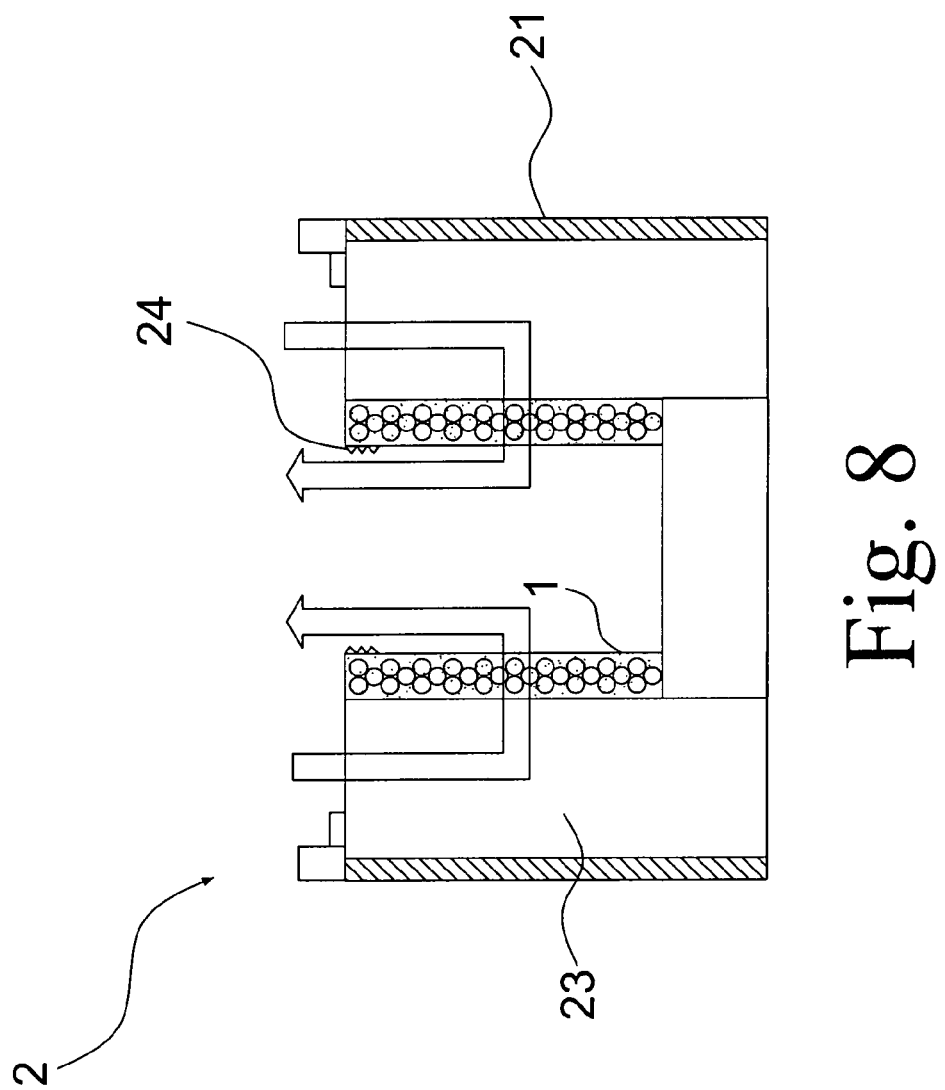
FIG. 8 is another cross-sectional view of the filter shown in FIG. 7.

Referring to FIGS. 7 and 8, a filter 2 includes a shell 21, non-magnetic filtering element 23 disposed within the shell 21 and the magnetic filtering film 1 disposed within the non-magnetic filtering element 23. The shell 21 is cylindrical. Entrances 22 and an exit 25 are defined in the shell 21. The entrances 22 are located around the exit 25. The magnetic filtering film 1 is rolled so that it becomes cylindrical. The non-magnetic filtering element 23 is located between the shell 21 and the magnetic filtering film 1. The non-magnetic filtering element 23 is filtering paper or a metal mesh. A thread 24 is formed on an internal side of the magnetic filtering film 1.

The lubrication oil goes through the filtering paper 23 and the magnetic filtering film 1 on its way to the exit 25 from the entrances 22. The filtering paper 23 filters grains. The magnetic filtering film 1 filters grains and attracts the ferromagnetic grains 112. Moreover, the magnetic filtering film 1 activates the molecules of the lubrication oil.

The present invention has been described via the detailed illustration of the embodiments. Those skilled in the art can derive variations from the embodiments without departing from the scope of the present invention. Therefore, the embodiments shall not limit the scope of the present invention defined in the claims.

This invention claimed is:

1. A magnetic filtering film comprising:
    a rubber film made of organic polymer and formed with apertures through which liquid can go; and
    micro-magnets distributed in the rubber film for attracting ferromagnetic grains from the liquid.

2. The magnetic filtering film according to claim 1, wherein the organic rubber is synthetic rubber.

3. The magnetic filtering film according to claim 2, wherein the synthetic rubber is selected from a group consisting of chloropene rubber, ethylene propylene diene monomer and polyurethane thermoplastic polyolefin.

4. The magnetic filtering film according to claim 1, wherein the organic rubber is composite rubber.

5. The magnetic filtering film according to claim 4, wherein the composite rubber is selected from a group consisting of styrene-butadiene-styrene copolymer, styrene-ethylene-butylene-styrene copolymer and thermoplastic polyolefin.

6. The magnetic filtering film according to claim 1, wherein the diameter of the micro-magnets is larger than 0.1 micrometer.

7. A magnetic filtering laminate comprising at least two magnetic filtering films each comprising:
    a rubber film made of organic polymer and formed with apertures through which liquid can go; and
    micro-magnets distributed in the rubber film for attracting ferromagnetic grains from the liquid.

8. The magnetic filtering film according to claim 7, wherein the apertures of one of the magnetic filtering films are aligned with the apertures of the other magnetic filtering film.

9. The magnetic filtering film according to claim 7, wherein the apertures of one of the magnetic filtering films are biased from the apertures of the other magnetic filtering film.

10. A magnetic filter comprising:
    a shell comprising at least one entrance and an exit;
    a non-magnetic filtering element disposed within the shell; and
    at least one magnetic filtering film disposed within the non-magnetic filtering element so that liquid goes through the non-magnetic filtering element and the magnetic filtering film on its way to the exit from the entrance, the magnetic filtering film comprising:
    a rubber film made of organic polymer and formed with apertures through which the liquid can go; and
    micro-magnets distributed in the rubber film for attracting ferromagnetic grains from the liquid.

11. The magnetic filtering film according to claim 10, wherein the non-magnetic filtering element is made of paper.

12. The magnetic filtering film according to claim 10, wherein the non-magnetic filtering element is a metal mesh.

* * * * *